April 1, 1947.  V. E. WATTS  2,418,438
METHOD FOR PRODUCING CURVED LAMINATED STRUCTURES
Filed Nov. 17, 1944  2 Sheets-Sheet 1
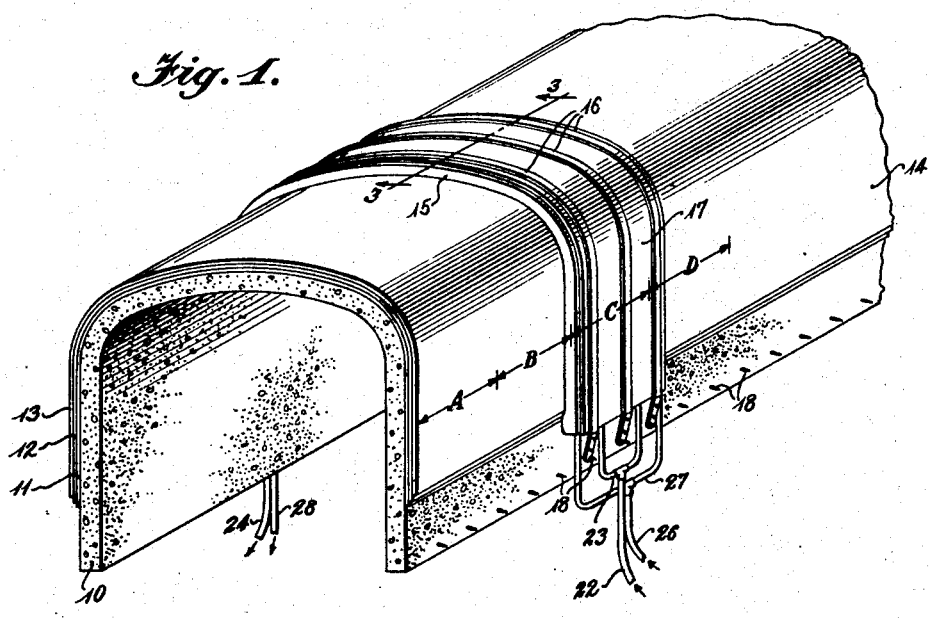
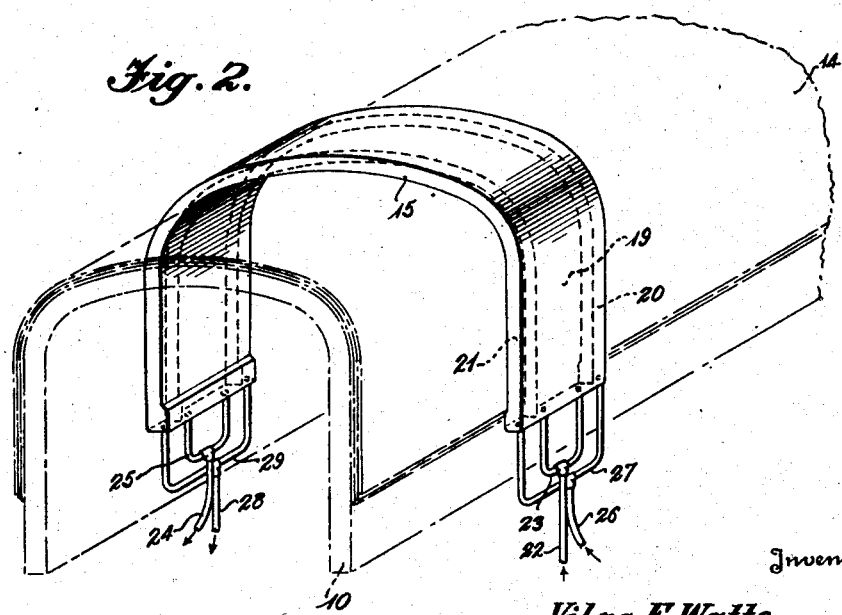
Inventor
Vilas E. Watts
By James P. Burns
Attorney April 1, 1947. V. E. WATTS 2,418,438
METHOD FOR PRODUCING CURVED LAMINATED STRUCTURES
Filed Nov. 17, 1944 2 Sheets-Sheet 2

Inventor
Vilas E. Watts
By James P. Burns
Attorney

Patented Apr. 1, 1947

2,418,438

UNITED STATES PATENT OFFICE 2,418,438

METHOD FOR PRODUCING CURVED LAMINATED STRUCTURES

Vilas E. Watts, San Francisco, Calif.

Application November 17, 1944, Serial No. 563,948

1 Claim. (Cl. 154—110)

This invention relates to a method for producing curved laminated structures. More particularly, the invention contemplates a method for the production of curved laminated plywood structures of great extent such as are applicable to marine, aircraft, silo, and like constructions.

It is an object of the invention to provide a practical effective method for producing curved laminated structures without necessitating the employment of expensive cumbersome equipment.

It is a specific object of the invention to provide a method for producing curved laminated structures embracing a plurality of plies having adhesive interposed between opposing surfaces of the plies without the use of presses, platens, and like instrumentalities.

More specifically, it is the object of the invention to provide a method embracing the provision of a base form, non-deformable under the conditions of operation, having a curved surface configuration conforming to that of the desired laminated structure, the building up of plies with intervening layers of heat-sensitive adhesive such as phenolic resin on the base form, applying heat and pressure to successive segments of the laminated structure on the curved surface thereof through the medium of a fluid-containing flexible bag, and so conducting the steps of the process as to preclude application of heat without pressure to areas of the structure that would be damaged thereby.

This application is a continuation-in-part of my copending application Serial Number 373,138, filed January 4, 1941.

Other and more detailed objects of the invention will become apparent as the description of the method proceeds, which will be given in connection with the accompanying drawings forming a part of this application and in which:

Fig. 1 is a perspective view illustrating an assembly embracing an extended curved laminated structure being fabricated in accordance with the invention;

Fig. 2 is a view showing in more detail certain elements of the assembly of Fig. 1;

Figure 3:
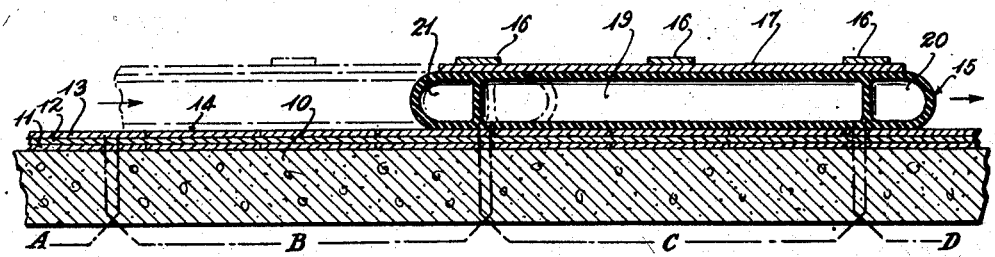
Fig. 3 is a sectional view along the line 3—3 of Fig. 1, and additionally illustrating in dotted lines the stepwise progression of the method.

While the method will be described in relationship to the accompanying drawings, it is to be understood that the drawings are by way of exemplification only and that the form and curvature of the laminated structure may vary materially from that illustrated.

The first step in the method resides in the provision of a suitable base form, non-deformable under the conditions of operation and having a curved surface configuration conforming to the desired curvature of the laminated structure to be produced.

In Fig. 1, the non-deformable base form is illustrated generally at 10, and in this instance is shown as being constructed of concrete, though it may be of any suitable material and construction so long as it is non-deformable under the conditions of operation and partakes of a curved surface conforming to that of the desired laminated structure.

The next step in the process embraces the building up on the non-deformable base form 10 of the plies indicated at 11, 12 and 13 of the laminated structure, with interposed layers of a heat-sensitive adhesive which may be either thermoplastic or thermosetting, the whole being capable of being permanently bonded or cemented as a unitary structure by the requisite application of heat and pressure.

The next step in the process embraces the stepwise application of the requisite heat and pressure to permanently cement and bond the laminated structure while in place on the non-deformable base form 10. This step of the process is carried out by applying the requisite heat and pressure, first to an initial segment such as segment A (Fig. 1) on the curved surface of the laminated structure indicated generally at 14, through the medium of a fluid-containing flexible bag 15 restrained to the contour of the segment A through the medium of suitable restraining straps 16, which may be of steel or other appropriate non-extensible material, and the flexible reinforcing member 17 lying between the straps 16 and the bag 15.

In the exemplified embodiment of the invention, the restraining straps 16 are adapted to be locked in restraining position by the pins 18 carried by the non-deformable base form 10. The heat-and-pressure applying assembly is shown in Fig. 1 at an intermediate stage in the stepwise progression along the extended curved laminated structure, it being understood that segments A and B of that structure are indicated as having already been cemented, with segment C shown as being under treatment.

The stepwise manner of progression is well illustrated in Fig. 3, wherein the flexible bag 15, shown in full lines, is shown with the heat-and-pressure section 19 thereof overlying segment C of the laminated structure 14, and shown in dotted lines with its heat-and-pressure section thereof overlying segment B of the laminated structure 14, the stepwise progression being in the direction of the arrows.

It is of vital importance that the cementing or bonding of the piles of the curved laminated structure 14 by the heat-sensitive adhesive be uniform throughout the extent of the curved laminated structure. It is a feature of the present invention that in the stepwise progressive application of heat and pressure to successive segments of the curved laminated structure, there will be no creeping of heat while being applied to one segment to the area of an adjacent segment not under pressure and where such heat would have a deleterious effect upon the bonding medium.

Figure 4:
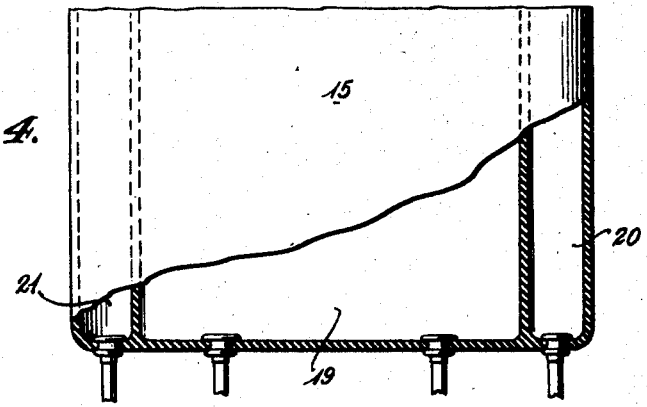
Fig. 4 is a detailed view of one form of flexible fluid-containing bag adapted for use as an element of the assembly employed in carrying out the method.

In carrying out the method, provision is therefore made to preclude the creeping of heat applied to one segment to adjacent areas not under pressure. With the assembly exemplified in Figs. 1 to 4 of the drawings, this is achieved by providing heat absorbing sections within the fluid-containing flexible bag 15. These marginal heat absorbing sections are shown at 20 and 21 in Figs. 3 and 4. Pressure is applied to a selected segment of the laminated structure 14 through the medium of the flexible bag 15 by circulating fluid under the required pressure through the expansible flexible bag 15 restrained to the contour of such segment.

Pressure is applied throughout the width of the flexible bag 15, but heat is applied only throughout the width of the heat applying section 19 to which fluid under the requisite heat and pressure is supplied by line 22 and header 23, which fluid is discharged at the opposite end of heat-and-pressure applying section 19 of bag 15 through line 24 and header 25, as shown in Fig. 2.

It will be understood that lines 22 and 24 are connected into a closed cycle provided with an appropriate circulating pump and heat restoring instrumentalities not shown. It will also be understood that the fluid circulated through the heat-and-pressure applying section 19 of the bag 15 will be a fluid that is appropriate for the purpose.

Heat absorbing pressure applying fluid is circulated through the marginal heat absorbing pressure applying sections 20 and 21 of the bag 15, by being supplied thereto through the line 26 and header 27, the fluid discharging from the opposite ends of the heat absorbing pressure applying marginal sections 20 and 21 of the bag 15 through the line 28 and header 29, shown in Fig. 2, and may be circulated in a closed cycle (not shown).

With the assembly in the position shown in Fig. 1, wherein the heat-and-pressure applying section 19 of the bag 15 overlies the segment C of the curved laminated structure 14, the requisite heat and pressure for bonding the heat-sensitive adhesive is applied to the segment C by the heated fluid circulating under the requisite pressure through section 19 of the bag 15. The applied heat is prevented from creeping to adjacent areas of previously treated segment B and untreated segment D by the cold heat absorbing pressure applying fluid circulated through the marginal sections 20 and 21 of the bag 15.

When a given segment such as segment C of Fig. 1 has been subjected to the requisite heat and pressure for a time interval appropriate to satisfy the requirements of the particular heat-sensitive adhesive employed, the elements of the assembly embracing the bag 15, the reinforcing member 17, and the restraining straps 16, are advanced to the next adjacent segment, as for example D in Fig. 1, and the operation repeated. This stepwise progression is continued until the entire structure has been cemented through application of the requiste heat and pressure. The fluid circulated through the marginal chambers 20 and 21 will be under the same pressure as the fluid circulated through the intermediate heat-and-pressure applying zone 19. However, the fluid moving through the marginal chambers 20 and 21 will be cold and will absorb and dissipate any tendency of the heat to creep from the segment such as C, to which heat and pressure is being applied to adjacent segments, to which heat and pressure has either already been applied or is yet to be applied.

The particular manner of conducting the method will depend somewhat on whether the adhesive employed as the bonding agent for the plies of the curved laminated structure 14 is thermosetting or thermoplastic. For example, where the adhesive is thermosetting so that the heating of as yet uncemented surface not under pressure would be deleterious, the cold fluid need only be circulated through the marginal chamber on that side of the bag 15 adjacent the as yet uncemented area of the curved laminated structure.

On the other hand, when the adhesive is thermoplastic so that the re-heating of an area that has already been cemented and is not under pressure would be deleterious, it is to be understood that the cold fluid will be circulated through the marginal chamber on that side of the bag 15 adjacent an already treated and cemented segment.

Figure 5:
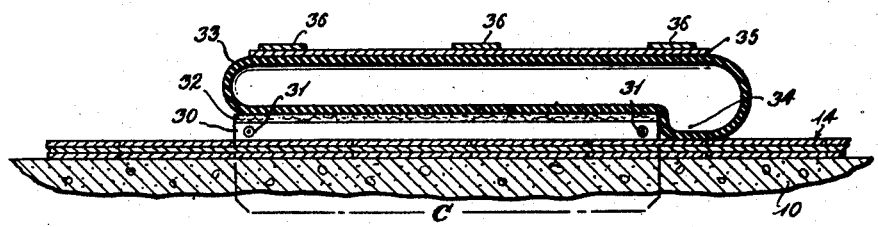
Fig. 5 illustrates a modified assembly adapted for use in carrying out the method of the invention.
Figure 6:
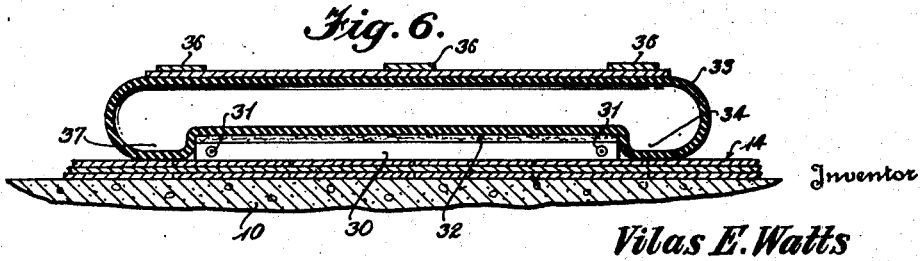
Fig. 6 illustrates still a further modified form of assembly capable of employment in carrying out the method of the invention.

The method is susceptible of being practiced through other instrumentalities than those specifically illustrated in Figs. 1 to 4 of the drawings, and a different form of assembly is illustrated in Figs. 5 and 6.

Referring to Fig. 5, laminated structure 14 on the non-deformable base 10 is adapted to have applied to a given segment thereof, such as C, a flexible electric heating pad 30 having appropriate wiring connections 31. This flexible heating pad 30 has dimensions conforming to the extent of the segment of the curved surface of the laminated structure desired to be treated in one step. An insulating pad 32 is adapted to overlie the heating pad 30, and is of the same dimensions as the pad 30. A flexible fluid-containing bag 33 is adapted to be placed over the pads 30 and 32, and as shown in Fig. 5 to extend a substantial distance beyond one side of the pads 30 and 32 as indicated at 34. A reinforcing flexible member 35, similar to the reinforcing flexible member 17, overlies the bag 33 and the restraining straps 36 are comparable to and perform the same function as the restraining straps 16 of Fig. 1.

It will be observed that the bag 33 is not subdivided into sections, but has a unitary fluid-containing chamber coextensive with the dimensions of the bag. In the employment of this assembly, it is unnecessary to provide a heated circulating fluid. Cold fluid only is circulated through the bag 33 under the requisite pressure to meet the requirements of the particular heat-sensitive adhesive being employed. The heat is applied through the electrical heating pad 30. That portion of the bag 33 which extends beyond the side of the pads 30 and 32 acts to provide a heat absorption area so that any heat tending to creep from the section C is absorbed by the cold fluid circulating through the bag 33.

The assembly as shown in Fig. 6 is the same as shown in Fig. 5, with the exception that the bag 33 extends beyond the heating pads 30 and 32 at both marginal edges thereof, as indicated at 34 and 37 in Fig. 6. In this way, a pressure applying heat absorbing area is provided on both sides of the heat applying instrumentality in the form of the electrical heating pad 30.

It will be understood that in employing the assemblies of Figs. 5 and 6, the stepwise progression will be the same as has been hereinbefore described in respect to the assembly of Figs. 1 to 4.

Generally speaking, it is desirable to use heat polymerizable synthetic resin which, when polymerized is water insoluble, infusible, and chemically inert, as the heat-sensitive adhesive, particularly in the fabrication of laminated marine structures and the lke. Resins suitable for use in carrying out the methods of the invention embrace the water-soluble phenolic liquid resins, concentrated urea resins, alcohol soluble phenolic resins, and dry phenolic resin films which may consist of tissue-thin paper impregnated with a phenolic resin.

The pressures required for effecting the proper bonding of the plies of the laminated structure will depend somewhat upon the particular character of the heat-sensitive adhesive employed, but will usually run in the neighborhood of from 15 to 350 pounds per square inch. The temperature will likewise vary depending upon the character of the heat-sensitive adhesive employed, but will usually not exceed 350° F. The time required for effectively bonding and cementing the plies of the curved laminated structure in a given segment may also vary somewhat depending not only on the character of the heat-sensitive adhesive but also upon the number of plies and the thickness of the over-all laminated structure. By way of example for a curved laminated structure having a total thickness of approximately five-eighths of an inch and employing a liquid phenolic resin, known commercially as "Bakelite resin X-C-1148," the time interval for the heat and pressure treatment of each segment will be approximately ten minutes.

It will be understood that in building up the plies 11, 12 and 13 on the non-deformable base 10, the different plies will be arranged with the grain of the wood in alternate layers extending in different directions so as to give an over-all rugged construction. The different sections of the plies need not be accurately planed to uniform thickness, since one of the great advantages of the instant invention resides in the fact that the uniform application of pressure is obtained throughout the area of a given segment treated, irrespective of irregularities in the surface and the thickness of the various elements of the respective plies. This is a result that cannot be achieved by ordinary platen rolls or presses, and it is highly advantageous, particularly in the production of extensive curved laminated structures for such exacting uses as marine hulls and aircraft wings.

It is to be understood that the foregoing description is by way of exemplification of the invention, and is not to be construed in limitation thereof, the scope of the invention being that of the subjoined claim.

Having thus described my invention, what I claim is:

A method for producing curved laminar structures of large dimensions and irregular contours containing adhesive between the opposing surfaces of the plies, comprising initially providing a stationary pressure-resisting form having a curvilinear surface of large area conforming to the desired curvilinear contour of the laminated structure to be produced, building up on said form a laminated structure embracing a plurality of plies with interposed layers of adhesive, applying pressure to all of a predetermined segment of the curved surface of said structure in a direction normal to said curved surface at all points thereof by fluid under pressure, applying heat to an intermediate part only of said segment, precluding the application of heat to that marginal part of said segment of the curved surface adjacent to the area of said structure which is not under pressure to prevent application of heat without pressure to areas of the structure that would be damaged by such heat, and repeating the application of heat and fluid pressure in the same manner to succeeding adjacent segments until all of the curved laminar structure has been cemented.

VILAS E. WATTS.

REFERENCES CITED

The following references are of record in the file of this patent:

UNITED STATES PATENTS

| Number | Name | Date |
| --- | --- | --- |
| 2,155,375 | Jablonsky | Apr. 18, 1939 |
| 1,321,517 | Frederick | Nov. 11, 1919 |
| 1,361,970 | Dickey | Dec. 14, 1920 |
| 2,320,022 | Wells et al. | May 25, 1943 |
| 2,018,736 | Norris | Oct. 29, 1935 |
| 2,138,620 | Strange | Nov. 29, 1938 |
| 2,287,320 | Mitchell | June 23, 1942 |
| 2,363,933 | Bendix | Nov. 28, 1944 |
| 2,364,597 | Atwood | Dec. 12, 1944 |
| 2,372,738 | Powell | Apr. 3, 1945 |

FOREIGN PATENTS

| Number | Country | Date |
| --- | --- | --- |
| 520,254 | German | Mar. 9, 1931 |